(12) United States Patent
Simonini et al.

(10) Patent No.: US 9,321,366 B1
(45) Date of Patent: Apr. 26, 2016

(54) ELECTRIC VEHICLE CHARGING BY ADJUSTING CHARGER CURRENT

(71) Applicant: Proterra Inc., Greenville, SC (US)

(72) Inventors: Matthew David Simonini, Greenville, SC (US); Michael Walker, Greenville, SC (US); Mike Finnern, Greer, SC (US); Seamus Timothy McGrath, Simpsonville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/564,378

(22) Filed: Dec. 9, 2014

(51) Int. Cl.
*H02J 7/00* (2006.01)
*B60L 11/18* (2006.01)

(52) U.S. Cl.
CPC .................................. *B60L 11/1838* (2013.01)

(58) Field of Classification Search
USPC .......................................................... 320/104
See application file for complete search history.

(56) References Cited

U.S. PATENT DOCUMENTS

| 2012/0056583 | A1* | 3/2012 | Gotz | 320/109 |
| 2013/0193918 | A1* | 8/2013 | Sarkar et al. | 320/109 |
| 2013/0274972 | A1* | 10/2013 | Kusumi et al. | 701/22 |

\* cited by examiner

*Primary Examiner* — Robert Grant
(74) *Attorney, Agent, or Firm* — Bookoff McAndrews, PLLC

(57) ABSTRACT

A method for charging an electric vehicle at a charging station may include electrically connecting the electric vehicle to the charging station, and determining a desired amount of energy to be provided to the electric vehicle at the charging station. The method may also include determining a layover time of the electric vehicle using a control system associated with the charging station. The layover time may be an amount of time the electric vehicle is expected to be positioned at the charging station. The method may also include calculating a charge current using the control system, wherein the charge current is a value of electric current that is needed to provide the desired amount of energy to the electric vehicle in a time period substantially equal to the layover time. The method may further include charging the electric vehicle using the calculated charge current.

18 Claims, 4 Drawing Sheets

- LAYOVER TIME
- INITIAL BATTERY TEMPERATURE
- EXPECTED BATTERY TEMPERATURE AFTER CHARGING
- CHARGER TEMPERATURE
- CURRENT SOC
- SOC NEEDED
- TIME OF DAY
- TIME IN ROUTE
- COOLING SYSTEM HEAT REJECTION CAPABILITY

ELECTRIC VEHICLE CHARGING BY ADJUSTING CHARGER CURRENT

TECHNICAL FIELD

The current disclosure relates to systems and methods for charging an electric vehicle. In particular, the current disclosure relates to a systems and methods for charging electric vehicles by optimizing vehicle down time, battery life, and system capability.

BACKGROUND

An electric vehicle (EV), also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external or auxiliary power supply. The flow of current into the battery during charging increases the temperature of the battery. Increased charge current speeds up the battery charging process. However, increasing the charge current increases battery temperature which decreases battery life and vehicle performance as a result of the increased temperature. Improvements in battery life may be achieved by controlling the temperature rise of the batteries during charging.

SUMMARY

Embodiments of the present disclosure relate to, among other things, systems and methods for controlling the charging of electric vehicles. Each of the embodiments disclosed herein may include one or more of the features described in connection with any of the other disclosed embodiments.

In one embodiment, a method for charging an electric vehicle at a charging station is disclosed. The method may include electrically connecting the electric vehicle to the charging station, and determining a desired amount of energy to be provided to the electric vehicle at the charging station. The method may also include determining a layover time of the electric vehicle using a control system associated with the charging station. The layover time may be an amount of time the electric vehicle is expected to be positioned at the charging station. The method may also include calculating a charge current using the control system, wherein the charge current is a value of electric current that is needed to provide the desired amount of energy to the electric vehicle in a time period substantially equal to the layover time. The method may further include charging the electric vehicle using the calculated charge current.

In another embodiment, a method for charging an electric bus at a charging station is disclosed. The method may include determining, using a control system, a desired amount of energy to be provided to the electric bus at the charging station. The method may also include determining a layover time of the bus at the charging station. The layover time may be an amount of time the bus is expected to be positioned at the charging station. The method may also include configuring the charging station to provide the desired amount of energy to the bus in a time period that is substantially equal to the layover time, and charging the bus for the time period after the configuring to provide the desired amount energy.

In yet another embodiment, a method of charging an electric transit bus is disclosed. A method of charging an electric transit bus including stopping the bus at a first charging station. The bus may be configured to remain at the first charging station for a first layover time. The method may also include charging the bus at the first charging station in a time period substantially equal to the first layover time. The method may also include stopping the bus at a second charging station. The bus may be configured to remain at the second charging station for a second layover time. The second layover time may be different from the first layover time. The method may further include charging the bus at the second charging station in a time period substantially equal to the second layover time.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes charging of an electric bus to increase vehicle efficiency and battery life without sacrificing operational efficiency. While principles of the current disclosure are described with reference to an electric bus, it should be understood that the disclosure is not limited thereto. Rather, the systems and methods of the present disclosure may be used to control the charging of any vehicle (cars, etc.) that uses one or more electric motors for propulsion.

Figure 1:
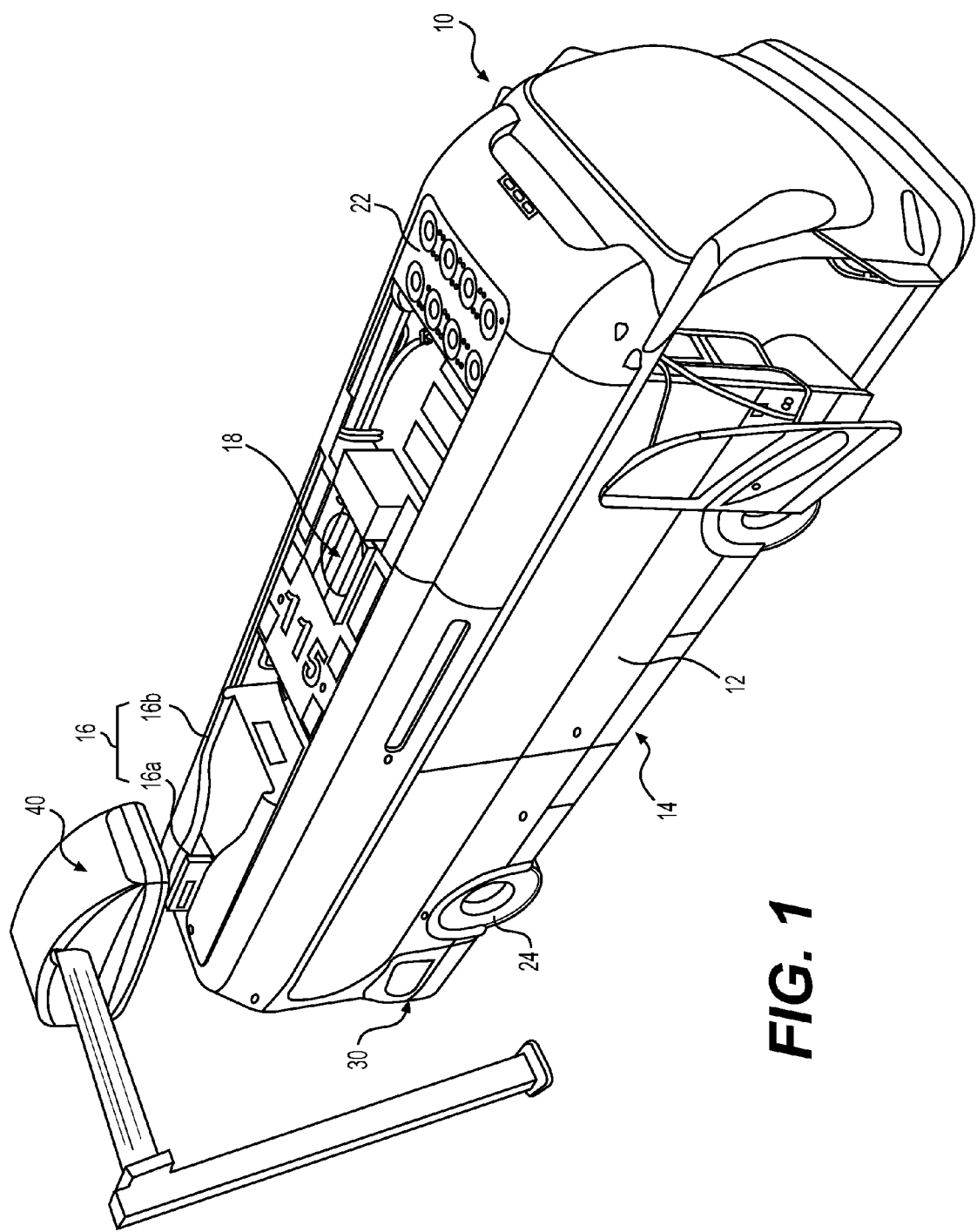
FIG. 1 is an illustration of an exemplary electric bus.

FIG. 1 illustrates an electric vehicle in the form of an electric transit bus 10. Electric bus 10 may include a body 12 enclosing a space for passengers. In some embodiments, some (or all) parts of body 12 may be fabricated using one or more composite materials to reduce the weight of bus 10. Without limitation, body 12 of bus 10 may have any size, shape, and configuration. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches from the road surface. In this disclosure, the term "about" is used to indicate a possible variation of ±10% in a stated numeric value.

Bus 10 may include a powertrain 30 that propels the bus 10 along a road surface. Powertrain 30 may include a single electric motor (not shown) that generates power, and a transmission that transmits the power to drive wheels 24 of the bus 10. Alternatively, bus 10 could include multiple electric motors, for example, an electric motor associated with some or all of the wheels of the bus 10. Batteries 14 may store electrical energy to power the electric motor. In some embodiments, these batteries 14 may be positioned under the floor of the bus 10, and may be configured as a plurality of battery packs. These battery packs may be positioned in cavities (not shown) located under the floor of the bus 10, and may be accessible from below the bus 10. The batteries 14 may have any chemistry and construction. In some embodiments, the batteries 14 may be lithium titanate batteries. In some embodiments, the layout and design of the batteries 14 may enable fast charging of the batteries 14. By fast charging, batteries 14 may be recharged (to greater than about 95% state of charge) in less than or equal to about 10 minutes. It is also contemplated that, in some embodiments, the batteries 14 may include multiple different chemistries. For example, some of the batteries 14 may be lithium titanate batteries, while others may have another chemistry (for example, lead-acid, nickel cadmium, nickel metal hydride, lithium ion, zinc air, etc.). Some of the possible battery chemistries and arrangements in bus 10 are described in commonly assigned U.S. Pat. No. 8,453,773 which is incorporated herein by reference in its entirety. Although batteries 14 are described as being positioned under the floor of the bus 10, this is only exemplary. In some embodiments, some or all of the batteries 14 may be positioned elsewhere on the bus 10. For example, some or all of the batteries 14 may be positioned on the roof of bus 10.

A charging interface 16 may be provided on the roof of the bus 10 to charge the batteries 14. The charging interface 16 may include components that interface with an external charging station 40 to charge the batteries 14. These components may include a charging blade 16a and an alignment scoop 16b. The alignment scoop 16b may align and direct a charging brace (schematically illustrated in FIG. 3) of the external charging station 40 towards the charging blade 16a to electrically connect them and charge the batteries 14. Some possible embodiments of charging interfaces 16 and charging stations 20 that may be used for bus 10 are described in commonly-assigned patents and patent applications: U.S. Pat. No. 8,324,858, U.S. Patent Application No. 2014/0070767 A, and International Application Publication Nos. WO/2011/079215, WO/2011/079215, and WO/2011/139680, which are incorporated by reference in their entirety herein.

Alternatively or additionally, bus 10 may also include an on-board charging device to charge the batteries 14. The on-board charging device may include an auxiliary power generation device (such as, an internal combustion engine or a fuel cell positioned, for example, on the roof) that generates power to charge the batteries 14. In some embodiments, bus 10 may be a pure electric vehicle and thus does not include an internal combustion engine. Bus 10 may also include components such as an HVAC system 18 to cool the passenger compartment, and a radiator 22 to cool the heat producing components of bus 10. A coolant may circulate between the radiator 22 and the heat producing components (such as, for example, motor, batteries, etc.) to dissipate heat produced by these components. Although the HVAC system 18, the radiator 22, and the charging interface 16 are illustrated as being positioned on the roof of the bus 10, in general, these components may be positioned anywhere on the bus 10.

Figure 2:
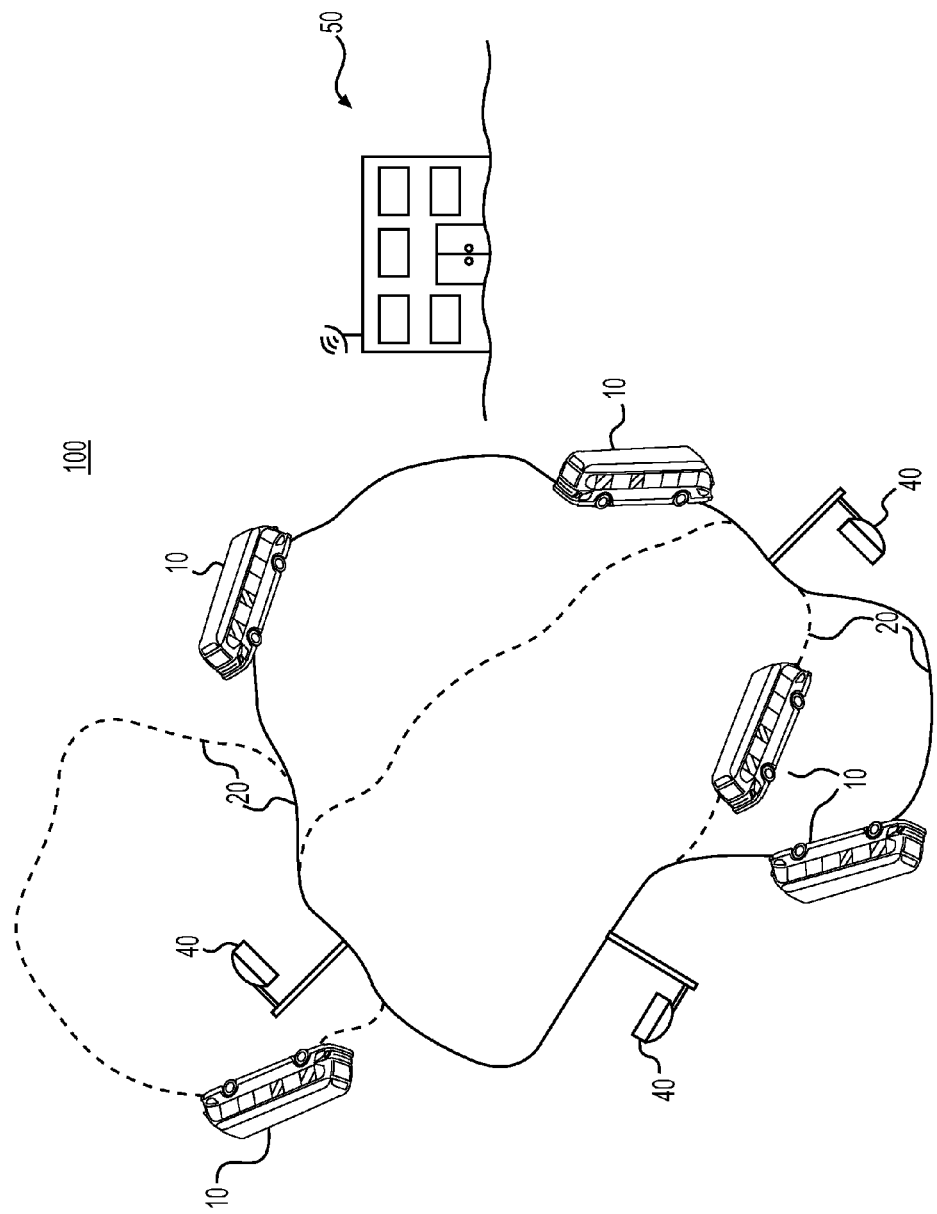
FIG. 2 is a schematic illustration of electric buses operating in multiple routes in a geographic area.

Electric bus 10 may be a transit bus that operates along a fixed route 20 in a geographic area 100. FIG. 2 schematically illustrate multiple buses 10 operating in a geographic area 100 that includes multiple routes 20. A bus 10 may continuously travel along a route 20 within a time window picking up and dropping off passengers at several fixed bus stops along the route 20. Geographic area 100 may include any area (airport, university campus, city, town, county, etc.) that includes one or more routes 20 serviced by one or more electric buses 10. A transit authority 50 (transport authority, airport authority, metro authority, hotel shuttle service, theme park shuttle service, etc.) may operate the buses 10 on a fixed schedule. One or more charging stations 40 may be positioned along the different routes 20 to charge the buses 10 that operate on these routes 20. The charging stations 40 may be coupled to an electric grid that is supplied with energy (electricity) by a utility company that services the geographic area 100.

When a bus 10 pulls up to a charging station 40, a charging brace (schematically illustrated in FIG. 3) of the charging station 40 separably interfaces with the charging blade 16a (see FIG. 1) of the bus 10 to charge the batteries 14 (of the bus 10). After charging the batteries to a desired level, the charging brace decouples from the charging blade 16a, and the bus 10 proceeds along its route 20. After a predetermined distance (or, after a predetermined time, or at a fixed location along route 20), the bus 10 pulls into a charging station 40 (the same or a different charging station 40) to get recharged. The charging stations 40 may be positioned such that they service the buses 10 operating on several different routes 20. In some embodiments, the charging stations 40 may be positioned at a bus stop so that the bus 10 may be recharged when passengers embark and disembark.

Charging stations 20 may have any power (for example, 500 Kilowatts (KW), 400 KW, 300 KW, etc.) and voltage (700 Volts (V), 600 V, 400 V, 300 V, 200 V, 100 V, etc.). In some embodiments, the charging station 40 may be configured to switch between several powers and voltages to charge a bus 10. In some embodiments, to minimize passenger wait times, the charging station 40 may be configured to recharge the bus 10 as fast as possible. For example, assume that a bus 10 has batteries 14 that can store 100 KWh (Kilowatt hour) of energy therein, and that the bus 10 consumes 40 KWh of energy while travelling between a previous recharge and charging station 40. Also assume that charging station 40 is a variable power charging system that is currently configured to charge the batteries 14 using 500 KW power at 300 V. At this setting, the charging station 40 will recharge 40 KWh of energy (to fully recharge the batteries 14) at a charge current (I) of 500 KW/300 V=1666 Amps. At this current, the bus 10 will be recharged in 40 KWh/500 KW=0.08 hr≅5 minutes. Because of inherent electrical resistances in the battery circuit, the amount of heat dissipated in the battery circuit during this recharging event is roughly $I^2R$ (based on Joule heating), where I is the recharge current and R is the total resistance of the battery circuit. The temperature of the batteries 14 and other components of the battery circuit (switches, etc.) increases due to this dissipated heat. The efficiency and life of the batteries 14 decrease with increasing temperature. Because of the thermal mass of the batteries, increased battery temperature also impacts the ability of the battery to provide peak performance for some time after the charge process. This time period is dictated by the ambient conditions and cooling system's ability to remove the generated heat.

In some embodiments, the charging station 40 may recharge the batteries 14 at a lower charge current (I). Decreasing the charge current (I) will increase the time it takes to recharge the batteries 14. However, a decreased current also decreases battery heating. For example, if in the example above, the batteries 14 are recharged over a time period of 8 minutes (8/60=0.133 hr) instead of 5 minutes, the charging station 40 power needed would be 40 KWh/0.133 hr=300 KW, and the charge current (I) used would be 300 KW/300 V=1000 Amps. Reducing the charge current from 1666 Amps to 1000 Amps will decrease the heat dissipated during recharging by about 36% (i.e., $1000^2/1666^2*100=36\%$). Decreasing the dissipated heat will decrease the temperature rise of the batteries 14 and increase battery life, vehicle performance, and system efficiency.

In some embodiments, instead of recharging the batteries 14 of a bus 10 as fast as possible (i.e., using the maximum power), the charging station 40 may recharge the batteries 14 using substantially the entire layover time of the bus 10 at the charging station 40. For example, a bus 10 may be scheduled to stop at a charging station 40 for 10 minutes (i.e., layover time of 10 minutes, for example, to load/unload passengers). The charging station 40 may determine the layover time of the bus 10 and the state of charge (SOC) of the batteries 14 of the bus 10 and recharge the batteries 14 over the entire layover time. For example, when a bus 10 with a 100 Kwh battery capacity stops at a charging station 40, the charging station may determine that the layover time of the bus 10 at that stop is 10 minutes, and further detect that the SOC of the batteries 14 of the bus 10 is 60% (SOC=Energy stored/Total energy capacity*100). Based on this information, the charging station may charge 40 KWh of energy (100 KWh–100 Kwh*60/100) in the batteries 14 in a time period that is substantially equal to the layover time (i.e., the charging process may be spread out over substantially the entire layover time). For example, based on the layover time of 10 minutes (0.167 hr) and the detected SOC, the charging station 40 may select a charging power of 40 KWh/0.167 hr=240 KW, and a current of 240 KW/300 V=800 Amps to charge the bus 10. Charging the bus 10 for 10 minutes at 800 Amps will provide 40 KWh of energy to its batteries 14. In an embodiment of the current disclosure where a passenger car is charged using the disclosed method, the car may be charged when it is parked at night (e.g., at home) or during the day (e.g., at work) when the car is not being used. Using the entire idle time period to charge the battery may result in increased battery life and efficiency without sacrificing operational efficiency.

Figure 3:
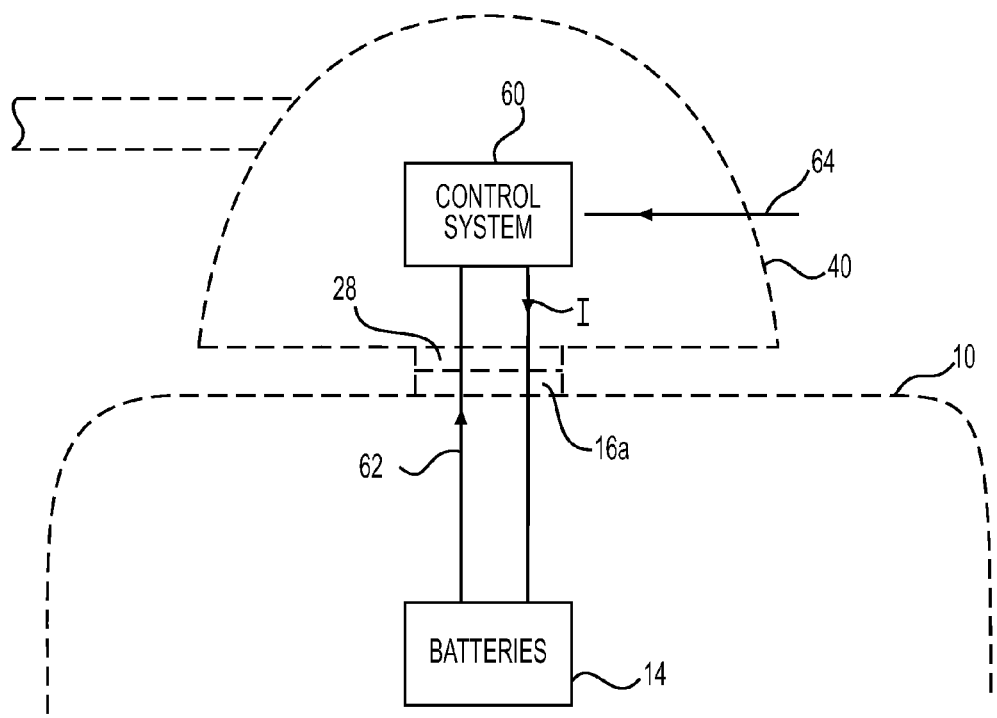
FIG. 3 is a schematic illustration of charging of the bus of FIG. 1 in one exemplary embodiment.

FIG. 3 is a schematic illustration of a charging blade 16a of a bus 10 in contact with a charging brace 28 of a charging station 40. The charging station 40 may be operatively coupled to a control system 60 configured to control the charging operations of the charging station 40. Although FIG. 3 illustrates the control system 60 as part of charging station 40, this is only exemplary. In general, the control system 60 may be positioned at any location (or multiple locations) and include one or more computer systems (or connected electronic devices) networked together over a wired or wireless network. In some embodiments, control system 60 may reside in one or more computer servers in the offices of the transit authority 50. In some embodiments, the control system 60 may be located in the charging station 40 or at another remote site. It is also contemplated that, in some embodiments, the control system 60 may be positioned in a bus 10. The control system 60 may be configured to receive data from and/or transmit data to, among others, buses 10, charging stations 40, and the transit authority 50. The control system 60 may transmit and receive data wirelessly and/or over a wired network. The control system 60 may also be configured to store data, perform computations, and relay data and/or instructions to the buses 10 and the charging stations 40. In some embodiments, the control system 60 may include input devices (such as, for example, key boards, disk/CD/DVD readers, memory card readers, cell phones, tablets, web browsers, phone applications, etc.) configured to input data into the control system 60, and output devices (display devices, printers, disk/CD/DVD/memory card writers) configured to output data and information. The control system 60 may also be configured to store data and other information, and perform computations on the stored and received data.

Control system 60 may include an algorithm configured to determine the charge current (I) and/or the charging station power needed to provide a required amount of energy to the batteries 14 in the layover time. In some embodiments, a bus 10 may take about 15-90 seconds to correctly position and dock with the charging station 40 (i.e., setup time) before beginning energy transfer. Therefore, in such embodiments, the actual time spent in charging the bus 10 may be between about 15-90 seconds less than the layover time. In an embodiment where about 1 minute of a 10 minute layover time is used for setup, although the bus is charged over substantially the entire layover time (i.e., in a time period that is substantially equal to the layover time), the actual time spent in energy transfer may only be about 9 minutes. The actual setup time for a bus may vary based on the driver's ability (slower drivers take longer to dock with the charge station) and other factors (bus stop and weather condition, passengers at the bus stop, etc.). In this disclosure, charging a bus in a time period that is substantially equal to the layover time, refers to charging the bus for a time period equal to the layover time minus the setup time. That is, in an embodiment, where the setup time is between 15-90 seconds, charging a bus in a time period that is substantially equal to the layover time (or charging the bus over substantially the entire layover time) refers to charging the bus for a time period that is 15-90 seconds less than the layover time.

The control system 60 may determine the layover time 64 of the bus 10 by any means. In some embodiments, the bus schedule may be stored in the control system 60. In some embodiments, the bus 10 may indicate the layover time 64 and the SOC 62 to the control system 60. In some embodiments, when a bus 10 pulls into a charging station 40, the bus may transmit (wirelessly or through a wired connection) the SOC 62 and the layover time 64 information to the control system 60. In some embodiments, when the charging brace 28 interfaces with the charging interface 16 of the bus 10, the SOC 62 and layover time 64 information may be transferred to the control system 60. In some embodiments, the control system 60 may determine the SOC 62 of the bus 10 from the batteries 14 (or a control system associated with the batteries 14), and the transit authority 50 may communicate the route information and/or the layover time 64 of the bus 10 to the control system 60. Based on this information, the control system 60 may determine a current limit (I) (and/or the power limit) needed to charge the bus in a time period that is substantially equal to the layover time 64 to minimize battery heating.

Additionally or alternatively, in some embodiments, the driver of the bus 10 may indicate the allowable charge time to the control system 60. That is, the driver of the bus may select the charge time using, for example, a control knob in the bus. In some embodiments, the bus 10 may include a mechanism (e.g., a switch) to override the charge time determined by the control system 60. For example, if circumstances require a bus 10 to be charged faster than the layover time (charge time determined by the control system 60), the driver may override the charge time by providing an allowable charge time.

Figure 4:
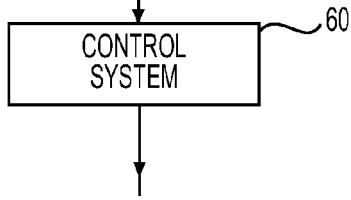
FIG. 4 is a schematic illustration of charging of the bus of FIG. 1 in another exemplary embodiment.

FIG. 4 is a schematic illustration of the control system 60 in another embodiment of the current application. As illustrated in FIG. 4, in some embodiments, the control system 60 may determine the charge current (I) based on several factors. These factors may include some or all of: layover time, initial battery temperature, expected battery temperature after charging, charger temperature, current SOC, SOC needed (until the next charging event), time of day, ambient temperature and associated vehicle heat rejection capability, etc. Based on some or all of these factors, the control system 60 may determine and/or optimize the charge current (I) or charge profile to increase battery life and vehicle efficiency.

In some embodiments, the schedule of all the buses 10 operating in a route 20 may be stored in the control system 60. And, based on the ID number of a bus 10 that interfaces with the charging station 40 (or that approaches a charging station 40), the control system 60 may identify the schedule of the bus 10 and determine its layover time. The control system 60 may then determine the current SOC of the bus 10 and the SOC needed to make it to the next scheduled charging event. Based on this data, the control system 60 may determine the amount of additional charge (if any) needed for the bus 10 to make it to the next scheduled charging event. The control system 60 may then determine the charge current (I) needed to charge this additional amount of charge over substantially the entire layover time.

In some embodiments, the control system 60 may further modify the charge current (I) based on the time of day and/or the temperature of the battery 14 and/or the charger. For example, during the beginning of bus operation, the batteries 14 are at a lower temperature than towards the end of their operation. Therefore, in some embodiments, the control system 60 may recharge the batteries 14 of a bus 10 to its full capacity during the beginning of its operation (for example, the first half of its operation), and recharge the batteries by only the amount needed to reach the next charging event (i.e., by the additional amount of charge described previously) during the end of its operation.

In some embodiments, the control system 60 may charge a bus 10 based on its battery 14 or the charger temperature. For instance, the control system 60 may recharge the batteries 14 to its full capacity when the battery temperature (or charger temperature) is below a threshold value, and recharge the batteries by only the amount needed to reach the next charging event when the battery temperature is above the threshold value. In an exemplary embodiment, along with the SOC of the bus and its layover time, temperature sensors associated with batteries 14 may indicate the battery temperature before charging. The control system 60 may then determine the charge current needed to charge the batteries 14 in a time period substantially equal to the layover time. The control system 60 may also estimate (for e.g., based on models, etc.) the expected temperature of the batteries 14 after charging. If the expected temperature is above a threshold value, the control system 60 may reduce the charge current to ensure that the expected temperature is below the threshold value. In some embodiments, the control system 60 may reduce the charge current based on the SOC needed until the next charging event. For example, if charging an additional 10 KWh of energy will enable the bus 10 to reach the next scheduled charging station, the control system 60 may reduce the charge current by reducing the amount of energy charged in the layover time.

Figure 5:
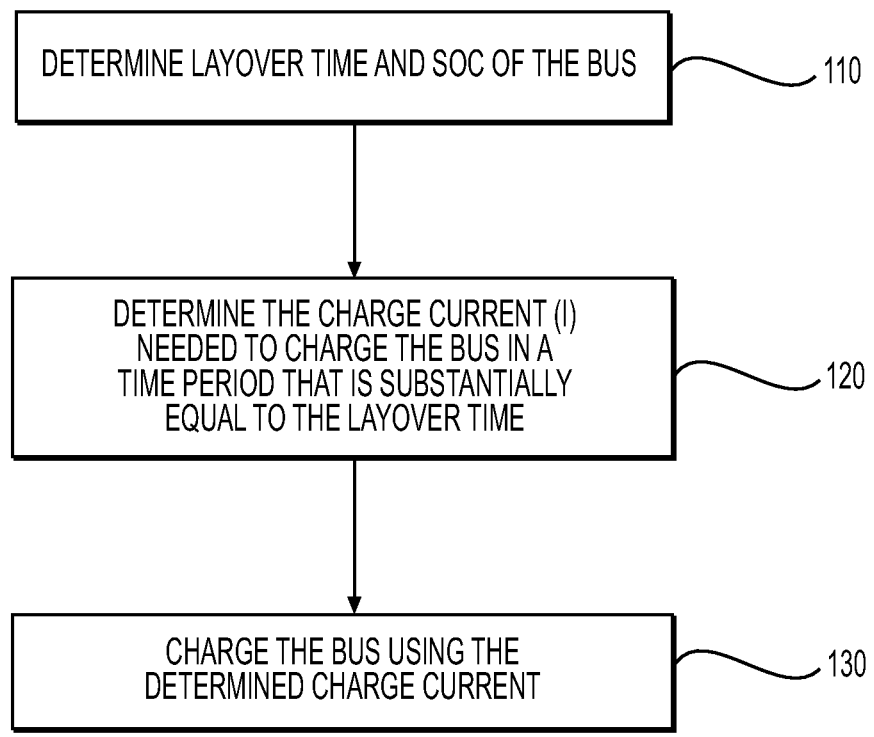
FIG. 5 is a flow chart that illustrates an exemplary bus battery charging process.

FIG. 5 illustrates an exemplary method of charging a bus 10 at a charging station 40. The layover time and SOC (of the batteries 14) of the bus is first determined (step 110). As explained previously, in some embodiments, the bus 10 may indicate its SOC and layover time as it approaches (or after it interfaces with) the charging station 40. In some embodiments, the charging station 40 and/or a control system 60 associated with the charging station 40 may determine the layover time based on the bus schedule stored or transferred to the control system 60 (or the charging station 40) from a remote source. The control system 60 and/or the charging station 40 may then determine the charge current (I) needed to fully charge the bus over substantially the entire layover time of the bus at the charging station 40 (step 120). In some embodiments, instead of fully charging the bus 10, the control system 60 may determine the charge current (I) needed to charge the bus by only an amount needed for it to reach the next charging scheduled event. The charging station 40 may then charge the bus 10 using the determined charge current over substantially the entire layover time.

While principles of the present disclosure are described with reference to an electric bus, it should be understood that the disclosure is not limited thereto. Rather, the systems and methods described herein may be employed to manage recharging of any electric vehicle (all-electric or hybrid vehicles). For example, while the disclosed embodiment describes charging a transit bus using substantially its entire layover time at a bus stop, in embodiments of the current application, the charging of an electric vehicle may be spread out over the time the vehicle is expected to be stopped at a certain location. For example, in an embodiment of the current disclosure applied to an electric car that is parked at work between 8 AM to 5 PM and at home between 8 PM and 6 AM, the charging of car may be adjusted to extend over the substantially the entire time the car is parked at work and/or at home. Extending the charging over the time the car is parked decreases the electric current directed to the batteries, thereby decreasing its temperature rise and increasing battery life.

Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of charging an electric transit bus at a bus stop which includes a charging station, the electric bus being configured to be charged by the charging station at the bus stop at a first stop and at a second stop subsequent to the first stop, comprising:

receiving, at a control system associated with the charging station, an operating schedule of the bus from a remote source, the operating schedule including information on both (a) a first layover time and (b) a second layover time, the first layover time being an amount of time the bus is expected to stop at the bus stop during the first stop to allow passengers to embark or disembark the bus, and the second layover time being an amount of time the bus is expected to stop at the bus stop during the second stop to allow passengers to embark or disembark the bus, the first layover time being different from the second layover time;

stopping the bus at the bus stop for the first stop;

calculating, using the control system, a first charge current, wherein the first charge current is a value of electric current that is needed to provide a desired amount of energy to the bus in a time period substantially equal to the first layover time;

charging the bus using the first charge current for a time period substantially equal to the first layover time;

stopping the bus at the bus stop for the second stop calculating, using the control system, a second charge current, wherein the second charge current is a value of electric current that is needed to provide a desired amount of energy to the bus in a time period substantially equal to the second layover time; and charging the bus using the second charge current for a time period substantially equal to the second layover time.

2. The method of claim 1, wherein calculating the first charge current includes determining the desired amount of energy based on a state of charge of the bus.

3. The method of claim 1, wherein receiving the operating schedule includes wirelessly receiving the operating schedule from the remote source.

4. The method of claim 1, wherein the electric transit bus is one of a plurality of buses operated in a geographic area by a transit authority, and wherein the operating schedule includes route and schedule information of all the buses operating in the geographic area.

5. The method of claim 1, further including modifying the charge current of the bus during charging based on input from a driver of the bus.

6. The method of claim 1, further including modifying the charge current of the bus during charging based on a temperature of a battery of the bus or a temperature of the charging station.

7. The method of claim 1, further including:
receiving bus identification information from the bus; and
determining the first layover time and the second layover time from the received operating schedule and the bus identifying information.

8. The method of claim 1, wherein the bus includes a charging interface positioned on a roof and the charging station of the bus stop includes a charge head configured to engage with the charging interface to charge the bus, and wherein stopping the bus at the bus stop for the first stop includes engaging the charge head of the charging station with the charging interface of the bus.

9. The method of claim 1, wherein the electric bus is a low floor electric bus.

10. A method for charging an electric bus at one or more bus stops that each includes a charging station, comprising:
receiving, at a control system, an operating schedule of the bus from a remote source, the operating schedule including information indicative of (a) a first layover time and (b) a second layover time, the first layover time being an amount of time the bus is scheduled to stop at a bus stop of the one or more bus stops at a first time, and the second layover time being an amount of time the bus is scheduled to stop at a bus stop of the one or more bus stops at a second time, the first layover time being different from the second layover time;
stopping the bus at a bus stop of the one or more bus stops at the first time;
calculating, using the control system, a first charge current, wherein the first charge current is a value of electric current that is needed to provide a desired amount of energy to the bus in a time period substantially equal to the first layover time;
charging the bus using the first charge current for a time period substantially equal to the first layover time;
stopping the bus at a bus stop of the one or more bus stops at the second time;
calculating, using the control system, a second charge current, wherein the second charge current is a value of electric current that is needed to provide a desired amount of energy to the bus in a time period substantially equal to the second layover time; and
charging the bus using the second charge current for a time period substantially equal to the second layover time.

11. The method of claim 10, wherein calculating the first charge current includes determining the desired amount of energy based on a state of charge of the bus.

12. The method of claim 10, wherein receiving the operating schedule includes wirelessly receiving the operating schedule from the remote source.

13. The method of claim 10, wherein the electric bus is one of a plurality of buses operated in a geographic area by a transit authority, and wherein the operating schedule includes route and schedule information of all the buses operating in the geographic area.

14. The method of claim 10, further including modifying the charge current of the bus during charging at the first time based on input from a driver of the bus.

15. The method of claim 10, further including modifying the charge current of the bus during charging at the first time based on a temperature of a battery of the bus or a temperature of the charging station.

16. The method of claim 10, further including:
receiving bus identification information from the bus; and
determining the first layover time and the second layover time from the received operating schedule and the bus identifying information.

17. The method of claim 10, wherein the bus includes a charging interface positioned on a roof and the charging station of each bus stop of the one or more bus stops includes a charge head configured to engage with the charging interface to charge the bus, and wherein stopping the bus at a bus stop for the first time includes engaging the charge head of the charging station with the charging interface of the bus.

18. The method of claim 10, wherein the electric bus is a low floor electric bus.

* * * * *